United States Patent [19]

Oono et al.

[11] 4,193,317

[45] Mar. 18, 1980

[54] FINE POSITION CONTROL DEVICE

[75] Inventors: Hiroshi Oono; Etuo Shiozawa, both of Asaka, Japan

[73] Assignee: Fuji Photo Film Co., Ltd., Asaka, Japan

[21] Appl. No.: 873,659

[22] Filed: Jan. 30, 1978

[30] Foreign Application Priority Data

Feb. 9, 1977 [JP] Japan .............................. 52-14404[U]

[51] Int. Cl.$^2$ ...................... G05G 11/00; B25B 11/00; B23Q 3/18
[52] U.S. Cl. ...................... 74/479; 108/137; 108/140; 108/143; 108/147; 248/179; 269/60; 269/71; 350/86
[58] Field of Search ................... 74/479; 108/137, 139, 108/140, 141, 143, 144, 147; 248/178, 179, 184, 416; 269/60, 71, 73; 350/86

[56] References Cited
U.S. PATENT DOCUMENTS

| 2,356,300 | 8/1944  | Boettcher    | 269/60    |
| 3,046,006 | 7/1962  | Kulicke, Jr. | 269/71 X  |
| 3,155,383 | 11/1964 | Whitmore     | 108/143 X |
| 3,377,111 | 4/1968  | Brault       | 350/86 X  |
| 3,555,916 | 1/1971  | Santy        | 350/86 X  |
| 3,638,932 | 2/1972  | Burnette     | 269/60    |
| 3,990,689 | 11/1976 | Eklund, Sr.  | 269/71    |

Primary Examiner—Allan D. Herrmann
Attorney, Agent, or Firm—Gerald J. Ferguson, Jr.; Joseph J. Baker

[57] ABSTRACT

A fine position control device for finely adjusting the position of a fixed information carrier such as a transparency in a COM (computer output microfilmer) system. This position control device is capable of moving a fixed information carrier in the X, Y and Z directions in an orthogonal coordinate system and also of rotating the same in the $\theta$-direction in the X-Y plane. The position control device has a Y-direction moving stage, an X-direction moving stage which moves in the Y-direction together with the Y-direction moving stage and is movable in X-direction independently of the Y-direction moving stage, a Z-direction moving stage which moves in the X-Y plane together with a member fixed to the X-direction moving stage and is movable in the Z-direction independently of the X-direction moving stage, and a $\theta$-direction rotating stage which moves together with the Z-direction moving stage and is rotatable in the X-Y plane independently of the Z-direction moving stage. The $\theta$-direction rotating stage is adapted to hold the fixed information carrier. The four stages are respectively connected via feed screws with four control knobs arranged in line.

7 Claims, 2 Drawing Figures

FINE POSITION CONTROL DEVICE

BACKGROUND OF THE INVENTION

1. Field of the Invention

This invention relates to a position control device, and more particularly to a device for controlling the position of an object, such as a transparency, in an optical projection system in three directions. The position control device in accordance with this invention is capable of moving an object independently in the X, Y and Z directions in an orthogonal coordinate system and of rotating the same in the X-Y plane.

2. Description of the Prior Art

A laser COM (computer output microfilmer) device is known in the art. This device uses a laser beam for recording the output information of a computer. When a highly collimated light beam, such as a laser beam, is used for recording information, an extremely small light spot of highly concentrated energy is obtained by focusing the beam. Therefore, in a laser COM the recording density is increased and a recording medium of low sensitivity can be used compared with a conventional COM device.

In the laser COM device, variable information is recorded on a recording medium by scanning the medium with a laser beam. Fixed information, such as a form of a list is recorded on the recording medium by projecting an image of the information on the medium. More specifically, the variable information of a computer output is recorded on the medium by a laser beam scanning system using a signal modulated laser beam. On the otherhand, fixed information, such as a form, is first printed on a transparency or the like and the image thereof is optically projected onto the recording medium. In this manner, the image of the transparency is superimposed over the variable information on the recording medium. In this way, both kinds of information can be recorded together on one recording medium. In the above arrangement, it is important that the image of the fixed information projected onto the recording medium should register precisely with the variable information recorded thereon. In order for the fixed information to be registered with the variable information on the recording medium, it is necessary to move one information with respect to the other on the recording medium. Further, in order to obtain a sharp image of the information on the recording medium, it is necessary to have some means of controlling the focus of the images of both types of information.

One countermeasure to solve this problem is to adjust a light beam deflector when using the variable information recording laser beam scanning system. However, this is disadvantageous in that it is difficult to effect a highly precise and stable registration because of temperature drift or the like, and it is impossible to rotate the image in the X-Y plane or to move it in the Z-direction. One other countermeasure to cope with the above problem is to move the transparency by mechanical means. Japanese Patent Publication No. 51-7799 shows an example of this mechanical means. The means shown in the Publication is, however, disadvantageous in that it is impossible to move the transparency in the Z-direction and in operation it is very difficult to control the position because three control knobs must constantly be kept in proper adjustment as the center of rotation is not fixed. Another, fine position control means for a COM device is disclosed in U.S. Pat. No. 3,988,063. The device disclosed therein is of the type which controls the position of a transparency carrying fixed information. This device is, however, very large and very complicated. In addition, it is known in the art of microscopy to finely control the position of an object in three directions in an orthogonal coordinate system and also to rotate the object in one plane. The position control means in this system is disadvantageous, however, in that the control knobs used for moving or rotating the object are not arranged in line and are difficult to operate. Further, even if the knobs were arranged in line, the control means would be thick in the Z-direction and the handling thereof would be troublesome.

SUMMARY OF THE INVENTION

The primary object of the present invention is to provide a position control device for a COM (computer output microfilmer) device which is free from the above enumerated drawbacks.

The specific object of the present invention is to provide a fine position control device for a COM device which is capable of finely moving a transparency in the X, Y and Z directions of an orthogonal coordinate system and rotating the same in the X-Y plane, and is compact in size and light in weight.

Another object of the present invention is to provide a fine position control device for a COM device in which the center of rotation of the transparency is fixed and consequently the control of position in four directions, i.e. the X, Y, Z and $\theta$-directions, can be carried out independently of one another.

Still another object of the present invention is to provide a fine position control device for a COM device in which the fixed information carrying means, namely transparencies, can easily be interchanged.

A further object of the present invention is to provide a fine position control device for a COM device in which the position is very finely and precisely controlled.

One further object of the present invention is to provide a fine position control device for a COM device which permits easy control of position in four directions by four knobs arranged in line.

The fine position control device in accordance with this invention is capable of moving a fixed information carrying means in the X, Y and Z directions of an orthogonal coordinate system and of rotating the same in the X-Y plane (sometimes referred to as the "$\theta$-direction" in this specification). The control device comprises a Y-direction moving stage, and an X-direction moving stage. The X-direction moving stage moves together with the Y-direction moving stage in the Y-direction but can also move in the X-direction independently of the Y-direction moving stage. Also a Z-direction moving stage movable in an X-Y plane together with a member which is moved integrally with the X-direction moving stage and movable in the Z-direction independently of the X-direction moving stage. Then there is a $\theta$-direction rotating stage movable together with the Z-direction moving state and rotatable in an X-Y plane. The fixed information carrying transparency is mounted on the $\theta$-direction rotating stage. The X, Y and Z direction moving stages and the $\theta$-direction rotating stage can be operated so as to move or rotate independently of one another by means of separate knobs.

The precision control device is incorporated in an optical projection system in which the image of the transparency mounted on the θ-direction rotating stage is projected on a recording medium. If the projection system is of transmission type, the θ-direction stage and other stages must be of a structure which permits transmission of light through the transparency mounted on the θ-direction rotating stage. If the projection system is of a reflection type, there is no need for the device to have the above structure.

DESCRIPTION OF THE PREFERRED EMBODIMENT

Figures 1, 2:
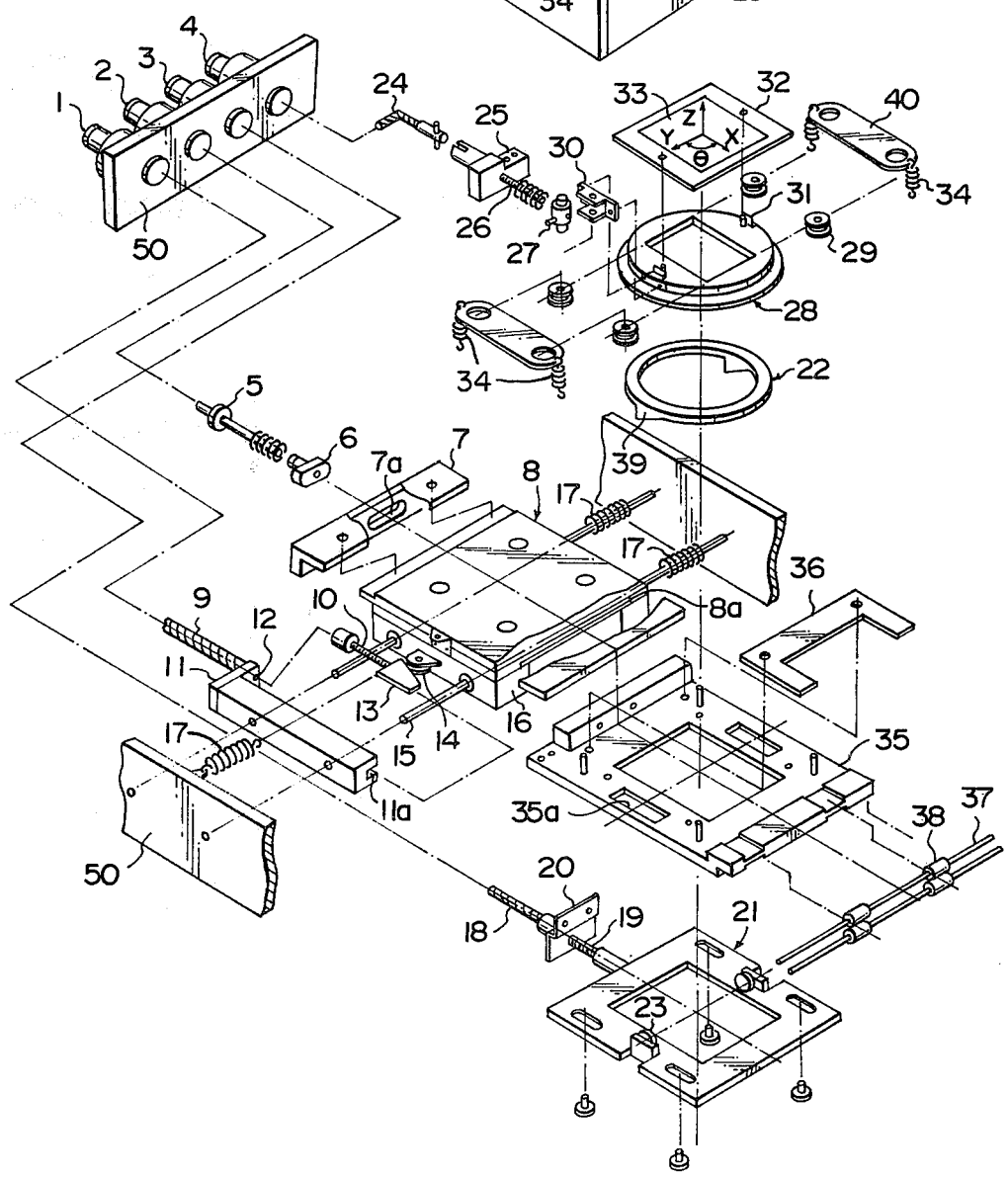
FIG. 1 is a perspective view showing an embodiment of the position control device in accordance with the present invention.
FIG. 2 is an exploded perspective view showing in detail the structure of the embodiment of the invention as shown in FIG. 1.

Referring to FIG. 1, a fixed information carrier 33 is moved and rotated by turning the control knobs 1, 2, 3 and 4. The first knob 1 is for moving the carrier 33 in a Y-direction. The second knob 2 is for the X-direction. The third knob 3 is for the Z-direction. The fourth knob 4 is for rotating the carrier 33 in a θ-direction in an X-Y plane. The three directions are shown in FIG. 2. In FIG. 3, the right hand portion holding the carrier 33 moves and rotates the carrier 33 in a Z-direction, and the left hand side portion moves the carrier 33 in the X and Y directions and is combined with the right hand side portion.

Now, with reference to FIG. 2, the X, Y and Z direction moving means and the θ-direction rotating means will be described in detail.

The X-direction moving means will first be described. The X-direction control knob 2 is connected with a feed screw 5 which is screw engaged with an intermediate member 6 having a female thread. The intermediate member 6 is engaged with an elongated hole 7a of a bracket 7 fixed to an X-direction moving stage 8. The intermediate member 6 is movable in the Y-direction in the elongated hole 7a but is not movable in the X-direction and is not rotatable about the axis of the feed screw 5. The X-direction moving stage 8 is mounted on a Y-direction moving stage 16 and is slidable thereon only in the X-direction along a dovetail shaped groove 8a provided on the upper face of the Y-direction moving stage 16. Since the knob 2 is rotatably supported in a fixed position on a casing 50, the X-direction moving stage 8 is moved in the X-direction by rotating the knob 2 thus rotating the feed screw 5.

The Y-direction moving means will now be described. The Y-direction control knob 1 is connected through a flexible strand 9 to a feed screw 10 which is rotatably mounted in a hole 12 of a member 11 fixed to the casing 50. The feed screw 10 is screw engaged with a wedge shaped cam 13 which is slidable along a groove 11a extending in the X-direction. The wedge shaped cam 13 is in pressure contact with a rotatable wheel 14 rotatable about a fixed shaft mounted to the Y-direction moving stage 16. The Y-direction moving stage 16 is slidable in the Y-direction along a pair of guide rails 15 and urged therealong towards the wedge shaped cam 13 by means of a pair of compression springs 17. Accordingly, as the knob 1 is rotated to rotate the feed screw 10 and move the wedge shaped cam 13 in the X-direction, the Y-direction moving stage 16 is moved in the Y-direction.

A frame 35 integrally connected with the X-direction moving stage 8 carries thereon a Z-direction moving stage 22 and a θ-direction rotating stage 28. Therefore, when the X-direction moving means or the Y-direction moving means is operated to move the fixed information carrier 33 in the X or Y direction, the Z-direction moving stage 22 and the θ-direction rotating stage 28 are also moved in the X or Y direction, as the case may be. The frame 35 is guided along a pair of fixed guide rails 37. The guide rails 37 are provided with slidable rollers 38 which engage with the lower and upper faces of the frame 35. The frame 35 is guided in the X and Y directions by the rails 37 and the rollers 38.

The Z-direction moving means will now be described. The Z-direction control knob 3 is connected through a flexible strand 18 to a feed screw 19 which is rotatably mounted on a member 20 which is secured to the X-direction moving stage 8. The feed screw 19 is screw engaged with a female thread provided in a slidable plate 21 which is slidable in the X-direction. The slidable plate 21 is located under the frame 35 fixed to the X-direction moving stage 8 and is provided with a pair of cam follower rollers 23 extending upwards through a pair of slots 35a provided in the frame 35. The cam follower rollers 23 are engaged with cams 39 provided on the lower face of the Z-direction moving stage 22 so that the Z-direction moving stage 22 is moved up and down in the Z-direction as the slidable plate 21 slides in the X-direction. A spacer 36 is interposed between the Z-direction moving stage 22 and the frame 35. The Z-direction moving stage 22 is spring urged downwards onto the slidable plate 21 by means of a pair of holding plates 40 which are provided with coil springs 34. The Z-direction moving stage 22 is spring urged downward by the holding plates 40 by way of the θ-direction rotating stage 28 interposed therebetween.

The θ-direction rotating means will now be described. The θ-direction rotating knob 4 is connected through a flexible strand 24 to a feed screw 26 which is rotatably mounted on a member 25 fixed to the frame 35. The feed screw 26 is screw engaged with a rotatable member 27 having a female thread. The rotatable member 27 is provided on a bracket 30 secured to the θ-direction rotating stage 28. The rotatable member 27 is rotatable about an axis extending in the Z-direction. The θ-direction rotating stage 28 is pushed upwards by the said Z-direction moving stage 22 and is rotatable supported by four rollers 29 to rotate about a fixed axis. The four rollers 29 are spring urged by the coil springs 34 so as to press downwards on the θ-direction rotating stage 28. When the θ-direction rotating knob 4 is turned, the rotatable member 27 is moved approximately in the X-direction. However, since the bracket 30 is secured to the θ-direction rotating stage 28, the movement of the rotatable member 27 in the X-direction causes the stage 28 to rotate about its center.

The fixed information carrier 33 is mounted to a film mount 32 which is removably mounted on the θ-direction rotating stage 28 by means of a pair of pins.

We claim:

1. A fine position control device capable of moving a fixed information carrier in the X, Y and Z directions of an orthogonal coordinate system and rotating the same in the X-Y plane, said device comprising:

a Y-direction moving stage, an X-direction moving stage which moves in the Y-direction together with said Y-direction moving stage and is movable in the X-direction independently of the Y-direction moving stage, a Z-direction moving stage which moves in the X-Y plane together with a member fixed to said X-direction moving stage and is movable in the Z-direction independently of the X-direction moving stage, a $\theta$-direction rotating stage which moves together with the said Z-direction moving stage and is rotatable in the X-Y plane independently of the Z-direction moving stage, said $\theta$-direction rotating stage being adapted to hold the fixed information carrier, and four position control knobs rotatable independently of one another and connected respectively with said X, Y and Z direction moving stages and said $\theta$-direction rotating stage by way of feed screws, whereby said stages are moved or rotated independently of one another by rotating said position control knobs to finely control the position of the fixed information carrier held on said $\theta$-direction rotating stage.

2. A fine position control device as claimed in claim 1 wherein said Y-direction moving stage is slidably guided along parallel rails and said X-direction moving stage is slidably engaged with the Y-direction moving stage to be slidable in the direction perpendicular to said parallel rails.

3. A fine position control device as claimed in claim 2 wherein said Y-direction moving stage guided along parallel rails is spring urged in one direction along the rails against a cam and cam follower engaging means provided at one end of the Y-direction moving stage, said cam and cam follower engaging means being connected with one of said position control knobs by way of a feed screw and a flexible strand.

4. A fine position control device as claimed in claim 2 wherein said X-direction moving stage slidably engaged with the Y-direction moving stage is connected with one of said position control knobs other than said knob connected with said cam and cam follower engaging means by way of a feed screw and a female threaded member engagement, said feed screw extending in the X-direction, and said threaded member is engaged with an elongated hole provided in a member secured to the X-direction moving stage, said elongated hole extending in the Y-direction to allow the movement of the threaded member in the Y-direction with respect to the member secured to the X-direction moving stage.

5. A fine position control device as claimed in claim 1 wherein said Z-direction moving stage is provided with a cam and is mounted on a slidable plate slidable in the X-Y plane which is provided with a cam follower to be engaged with said cam so that the Z-direction moving stage is moved in the Z-direction as the slidable plate is slid in the X-Y plane, said slidable plate being connected with one of said position control knobs by way of a feed screw and a female threaded member engagement.

6. A fine position control device as claimed in claim 1 wherein said $\theta$-direction rotating stage is rotatably supported by rollers stationarily located around the stage and is mounted on said Z-direction moving stage so as to be moved in the Z-direction together therewith, said $\theta$-direction rotating stage being connected with one of said position control knobs by way of a feed screw and a female threaded member which is rotatably mounted on the $\theta$-direction rotating stage, said female threaded member being rotatable about an axis extending in the Z-direction.

7. A fine position control device as claimed in claim 1 wherein said four position control knobs are arranged in line.

* * * * *